Oct. 25, 1960 E. A. HALL 2,957,281
MAGNETIC UNLOADER AND METHOD
Filed May 14, 1956 4 Sheets-Sheet 1

Inventor
EDWIN A. HALL
by [signature] Attys.

Oct. 25, 1960 — E. A. HALL — 2,957,281
MAGNETIC UNLOADER AND METHOD
Filed May 14, 1956 — 4 Sheets-Sheet 2

Inventor
EDWIN A. HALL

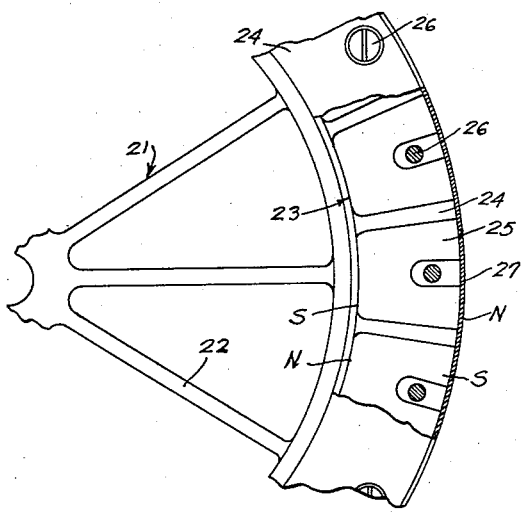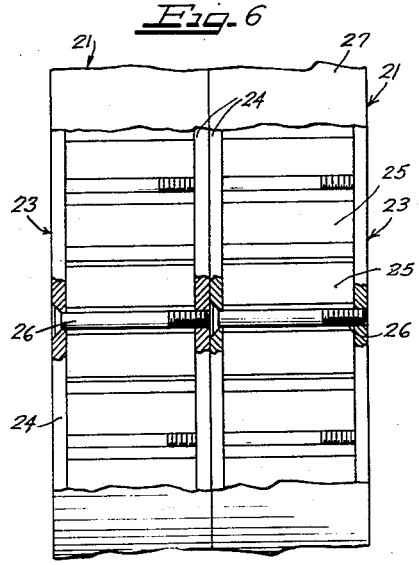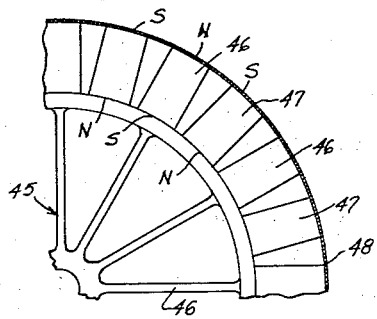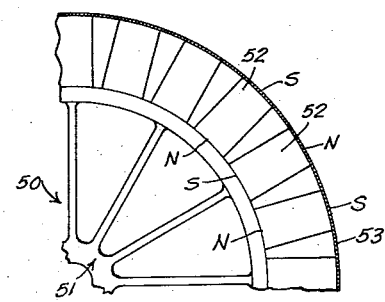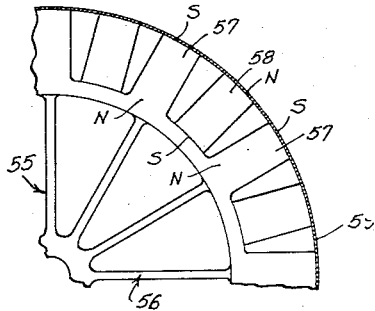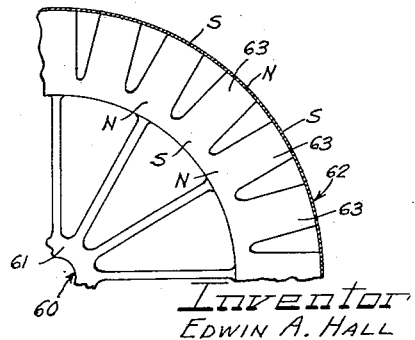

Oct. 25, 1960 E. A. HALL 2,957,281
MAGNETIC UNLOADER AND METHOD
Filed May 14, 1956 4 Sheets-Sheet 4
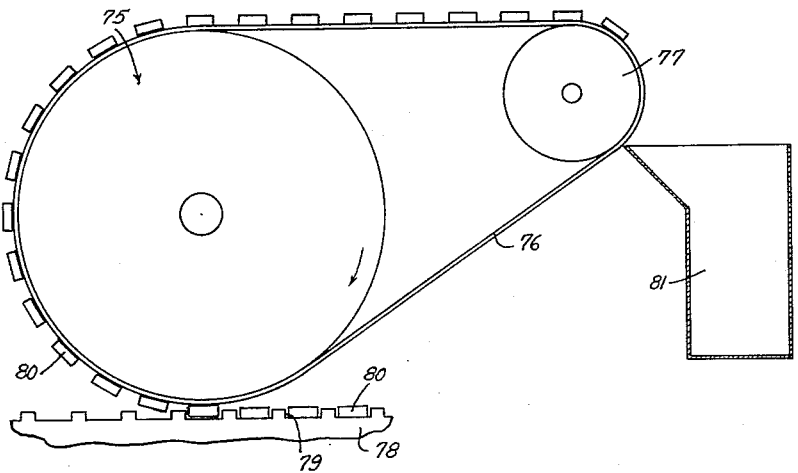
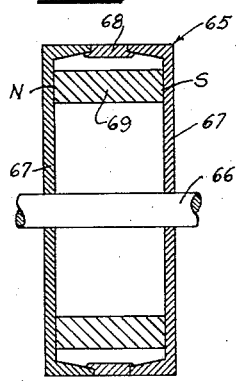
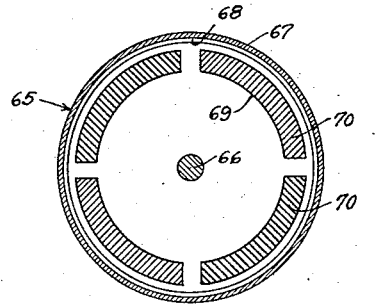
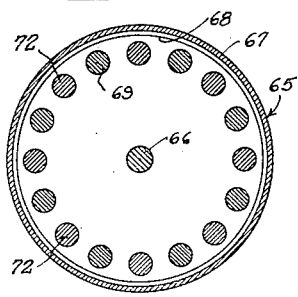
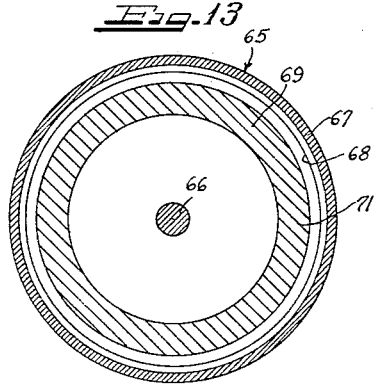
Inventor
EDWIN A. HALL United States Patent Office 2,957,281
Patented Oct. 25, 1960

2,957,281

MAGNETIC UNLOADER AND METHOD

Edwin A. Hall, Valparaiso, Ind., assignor to Indiana General Corporation, a corporation of Indiana Filed May 14, 1956, Ser. No. 584,486

25 Claims. (Cl. 51—134)

This invention relates generally to an unloading or retrieving device. More particularly the invention relates to a magnetic unloader or retriever for a machine such as an abrading or processing apparatus, and to a method of operating the same to process magnetizable articles.

The abrader, such as a grinding machine, includes a work table which is rotatable about its vertical axis and has annularly arranged, radially spaced rows of sockets adapted to receive metal articles for the grinding operation. As the table is rotated, the articles are brought into contact with an abrading surface that simultaneously grinds a plurality of the articles. Disposed beyond or downstream of the processing zone is my magnetic retriever, which comprises a rotatable magnetized wheel adapted to rotate clockwise in a vertical plane relative to the counterclockwise moving work table lying in a horizontal plane and at the same or greater linear or surface, speed. This magnetized wheel is adapted to remove the magnetizable articles from their respective sockets and either dump them in a storage hopper if the articles have been ground to the desired finish and dimensions or, by means such as chutes, return and load the articles in other sockets on the work table for subsequent processing.

Accordingly, an object of this invention is to provide a novel magnetic unloading or retrieving device.

Another object of this invention is to provide a fully automatic abrading machine for grinding magnetizable articles, which machine is adapted to either finish or abrade the article in one or more passes through the abrader to a predetermined specification.

Another object of this invention is to provide a method of abrading metal articles which is fully automatic.

Yet another object of this invention is to provide an unloader for an abrading apparatus which is relatively economical to manufacture, is efficient in operation, and greatly reduces the cost of processing or abrading magnetizable articles as a result of providing a fully automatic operation.

A feature of this invention relates to different ways in which the magnetic elements may be disposed on my magnetic retriever.

Still another feature of this invention relates to the combination with a grinding machine having a number of radially spaced rows of circumferentially spaced cavities or sockets in which articles to be processed are carried, with my magnetic retriever comprising one or more wheels overlying the rows of cavities to magnetically retrieve the articles as they come into proximity to the retriever.

Yet another feature of this invention relates to the provision of chutes adjacent and associated with my magnetic retriever to unload the articles therefrom and either convey them to storage bins or direct the magnetizable articles back onto the work table for further processing.

A further feature of this invention relates to the provision of a non-magnetic belt about my magnetic retriever and a spaced non-magnetic pulley, which belt is adapted to unload the retriever and carry the magnetizable articles into a storage bin or back onto the work table as the case may be.

Other objects and features of the present invention will more fully become apparent from the following detailed description taken in connection with the accompanying drawings illustrating several embodiments thereof, and in which:

Figure 5 is a fragmentary vertical cross-section, partly in elevation, of one form of my magnetic retriever;

Figure 6 is a fragmentary side elevation of another form of magnetic retriever, with parts shown in elevation and cross-section;

Figure 7 is a fragmentary diagrammatic view, with parts in cross-section, showing still another form of magnetic unloader;

Figure 8 is a fragmentary diagrammatic view, with parts in cross-section, showing yet another form of magnetic unloader;

Figure 9 is a fragmentary diagrammatic view, with parts in cross-section, showing a further form of magnetic unloader;

Figure 10 is a fragmentary diagrammatic view, with parts in cross-section, showing a still further form of magnetic unloader;

Figure 11 is a vertical cross-sectional view with parts in elevation of another form of magnetic retriever;

Figure 12 is a front elevation of still another form of magnetic retriever with parts in cross-section;

Figure 13 is a front elevation of yet another form of magnetic retriever with parts in cross-section;

Figure 14 is a front elevation of a still further form of magnetic retriever with parts in cross-section; and Figure 15 is an enlarged diagrammatic view of my retriever, showing a modified arrangement for unloading the magnetic retriever.

As shown on the drawings:

Figures 1, 2:
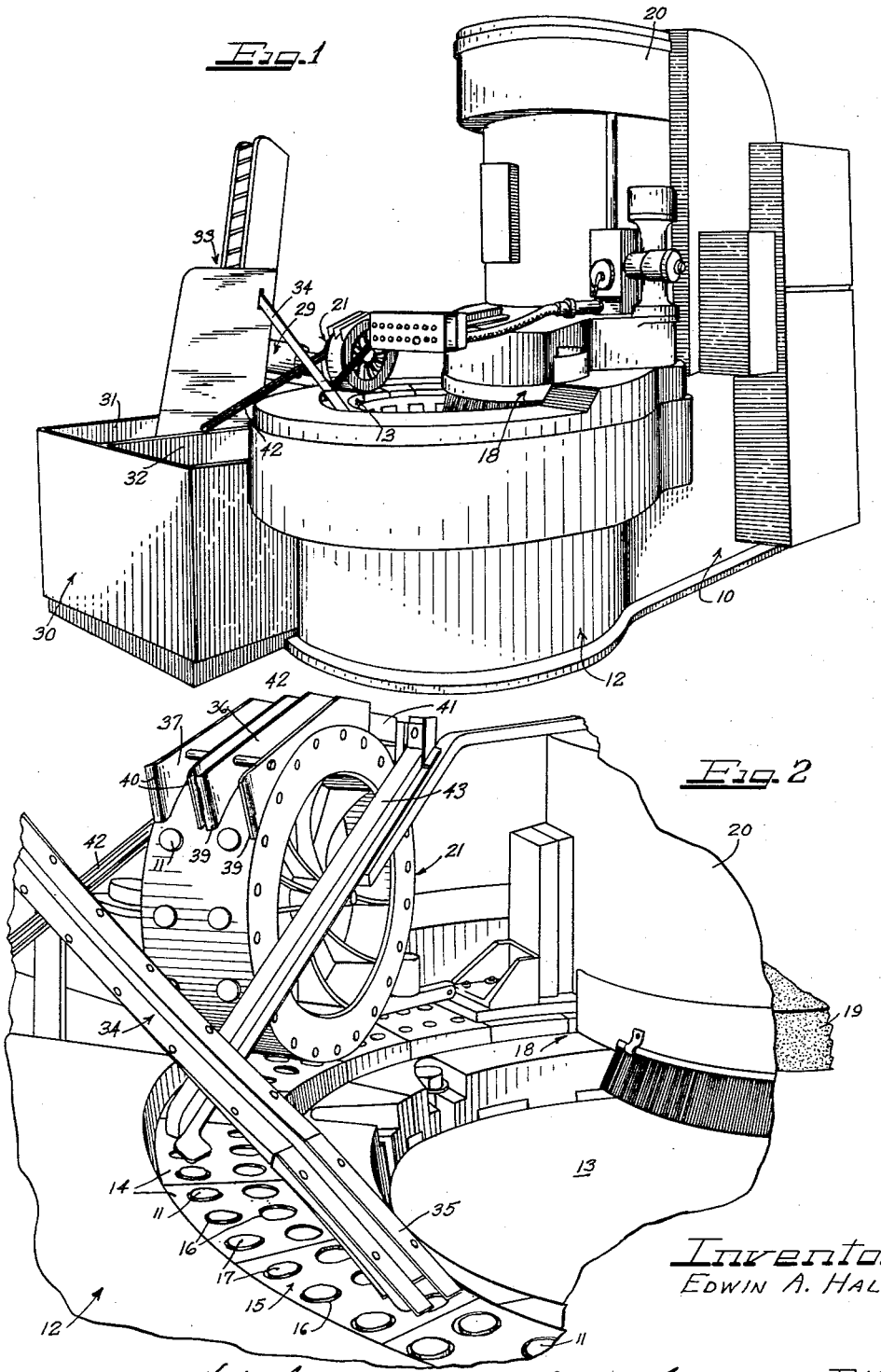
Figure 1 is a perspective view of a grinding machine having my magnetic retriever thereon.
Figure 2 is an enlarged fragmentary perspective view of a portion of the structure in Figure 1.

The reference numeral 10 indicates generally an abrading machine or apparatus, and specifically a plane surface grinder adapted to grind articles of any suitable shape made from such magnetic materials as iron, nickel, and alloys thereof, particularly permanent magnet alloys of the Alnico type that are not easily machinable.

The present invention concerns itself with the automatic processing of the magnetizable articles to substantially eliminate any manual work once the machine or apparatus 10 has been set up. While the principles of this invention have been particularly illustrated in connection with a grinder, the broad principles are equally applicable to other processes in connection with magnetizable articles.

The grinder 10 includes a base portion 12 upon which is carried a rotatable work table or rotary structure 13 and in operation may be driven by drive means (not shown) in a counter clockwise movement. Carried and fastened upon the radially outer margin of the work table are annularly arranged segments 14 together making up a circular support 15 by which the articles 11 are carried and firmly held in sockets or blank holders 16. The sockets 16 are circumferentially spaced and arranged in one or more radially spaced rows. These sockets each are adapted in the present grinding machine to receive a magnetizable article or blank 11 in such a manner that a top surface 17 (Figure 2) of the article extends a predetermined distance above the support 15.

As the work table 13 is rotated, the articles 11 are carried into a processing or abrading zone 18. At the abrading zone a grinding wheel 19 having in this instance a vertical axis is suspended from a supporting structural portion 20 of the apparatus 10 and is driven by suitable power means (not shown) at a predetermined variable rate. The wheel 19 may be adjusted if desired in any suitable manner to obtain different angles or planes of application of the grinding surface on the articles 11.

Positioned downstream of the abrading zone 18 is my magnetic unloader and retriever or wheel 21 which preferably rotates at the same rate as the work table. The retriever 21 may comprise any one of a number of different constructions, a few of which have been shown in Figures 5-14. One very satisfactory arrangement is shown in Figure 5 wherein a spoked cast wheel 22 is shown, preferably made from aluminum. Disposed at the outer periphery of the spoked wheel 22 is an end plate retaining ring 23 which may be suitably connected to the spoked wheel 22 and may be made from any suitable material such as aluminum or other non-magnetic material. The ring 22 has radially outwardly extending axially spaced side portions or flanges 24—24. Disposed between the side portions 24—24 at circumferentially spaced intervals are V-shaped permanent magnets 25. These magnets are secured in place to the side portions 24—24 by headed screws 26 which may act to draw the side portions in a resilient manner firmly against the magnets to insure a close fit. The north and south poles N, S of the magnets are alternated to set up a magnetic field at the outer periphery of the retriever 21. An outer cover 27, preferably comprising a non-magnetic sleeve, or band, made from any suitable material, is disposed about the outer periphery of the ring 23, thereby affording a smooth surface to which the articles 11 may adhere as the retriever is rotated on its axis. By providing a non-magnetic cover 27, the retriever may be more readily assembled and disassembled. This enables the retriever to be assembled with ease and thereafter disassembled should it be desired to alter the magnet arrangement or the like.

Figure 3:
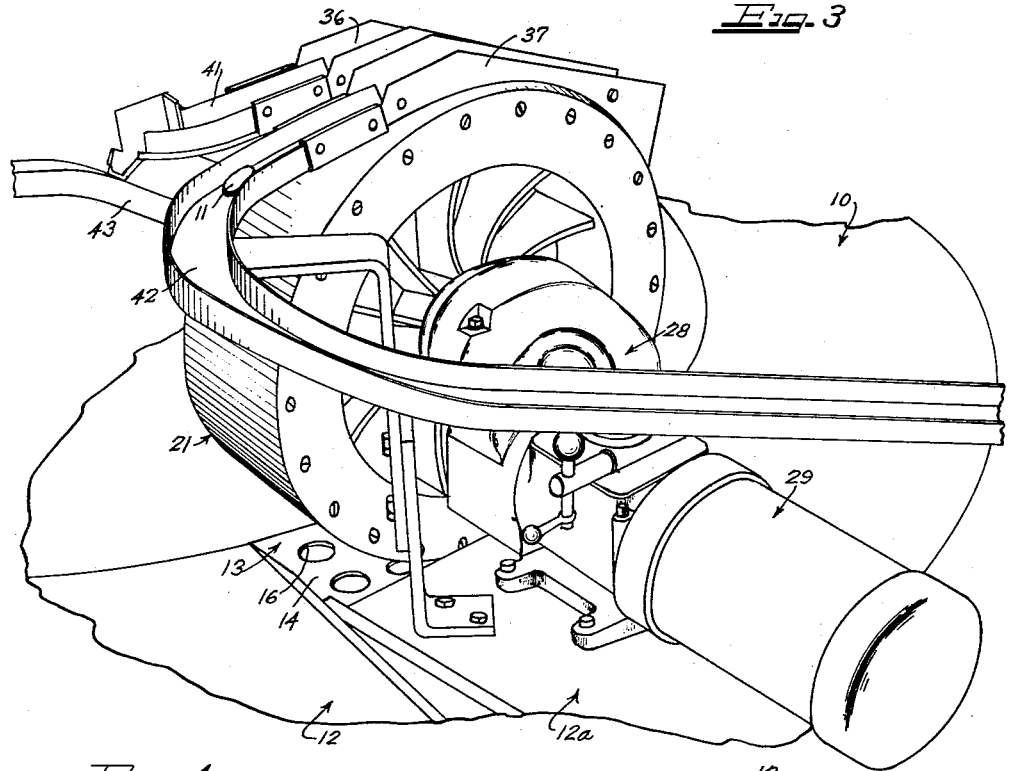
Figure 3 is an enlarged fragmentary perspective view showing the reverse side of my magnetic retriever shown in Figures 1 and 2.
Figure 4:
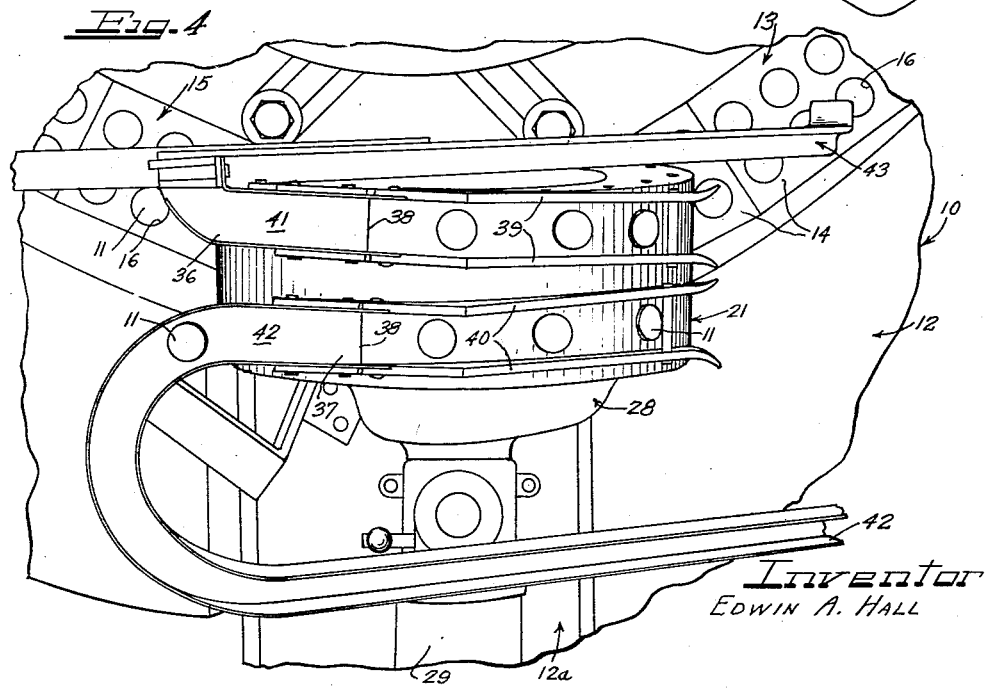
Figure 4 is an enlarged fragmentary plan view of my magnetic unloader and retriever.

Shown in Figure 3 is a speed reducer 28 and a motor 29 which are supported and carried upon a radially slidable portion 12a of the base 12 (Figure 4). The speed reducer is provided with a conventional drive shaft (not shown) which is adapted to be connected with the central hub of the retriever 21 in any suitable manner. Any other suitable driving means may be used for driving the retriever 21 such as the retriever 21 being driven from the rotating table 13. The retriever 21 is rotatable in a clockwise direction (Figure 2).

Positioned adjacent the retriever 21 is a hopper 30 having bins 31 and 32, bin 31 being adapted to receive the articles 11 in a raw unprocessed or unabraded condition and bin 32 being adapted to receive the articles after they have been at least partially processed or abraded. Associated with the bin 31 is unfinished blank loader means which includes a conveyor assembly 33 which is adapted to pick up the articles 11 and carry them to a chute 34 which has an end portion 35 positioned adjacent the inside row of cavities 16 (Figure 2) immediately adjacent the top surface of the support 15 in order to fill the cavities as the work table 13 is rotated in a counterclockwise direction.

As the articles in the inside row of cavities 16 are brought into the processing or abrading zone 18 they are processed or abraded in a preliminary manner. After leaving the abrading zone 18 the elements are removed as will hereafter become apparent.

Suitably supported by the grinder 10 is unloading and loading means which includes the retriever 21 and scoops 36 and 37. Each of the scoops 36 and 37 has an edge 38 which bears against the outer surface of the retriever 21 to scoop up the articles 11. In order for the articles to be properly directed against the scoop edge 38, guides 39 and 40 are provided for each of the scoops 36 and 37 (Figures 2 and 4).

The scoops 36 and 37 constitute ends of chutes 41 and 42 which are also part of the unloading and loading means for conveying the partially finished articles from the table 13 back to the table to present a different portion of the articles or blanks for processing. Chute 41 is adapted to unload into another chute 43. The partially finished articles 11 as they are removed from the inside row of cavities 16 are scooped up by the scoop 36, directed into the chute 41 and dropped into the chute 43 from which they are thereafter dropped into the next radially outer row of cavities. The chutes 41 and 43 may be so arranged that when the partially abraded article drops into the chute 43, the abraded side is down so that when the articles are redeposited into the outer row of sockets or cavities, the opposite of the articles may be abraded too. These articles that are dropped into the radially outer rows of cavities are then returned to the processing zone 18 and either further processed or finish processed.

After the articles 11 have left the abrading zone they are again picked up by the retriever 21 and unloaded from the retriever by means of the scoop 37, whereupon they are directed into the chute 42. The chute 42 leads to the bin 32, which is adapted to receive the processed or ground articles.

In view of the foregoing discussion it will now be comprehended the articles 11 on the retriever 21 act to force previous articles 11 into the chutes where by gravity they are again fed to the work table into the outer row of cavities 16. If desired, the articles 11 could be directed immediately into the hopper 30. A further feature of this invention resides in the fact chutes 41 and 43 may be so constructed and arranged relative to one another they will deliver to the outer row of cavities either the ground side down or up or at another angle depending upon the shape of the article and subsequent grinding required. After the articles have been passed under the grinding wheel for the second time they are in the illustrated instance picked up by the retriever and guided into chute 42 where they can be fed to the bin 32 or subjected to further process or processes as is desired.

In view of the foregoing description it will now be understood that the articles 11 move in a stream through a first arc while a portion of each of the articles is processed in the processing zone 18. The articles are then angularly moved by the wheel 21 and the scoop 36 and the chute 43 in a stream away from the plane of the first arc after they have been initially processed. The stream of partially finished articles is then directed in a second arc concentric with the first arc as the articles are discharged from the chute 43 into the sockets 16. The second arc is concentric with the first arc and is in a plane generally common to the first arc and each of the articles travel through a series of different sized concentric arcs as the articles are processed to the desired extent.

By rearranging the chutes the articles 11 carried in both rows of cavities 16 could be fed directly into the hopper 30 or subjected to further process or processes after only a single process or grinding operation has been completed. If additional grinding or processing is desired or required, additional radially spaced rows of circumferentially spaced cavities 16 could be fed by having additional chutes to feed them as is required.

In view of the foregoing, while my novel magnetic retriever 21 has been shown in use with grinder, the magnetic retriever 21 could also be used for other similar purposes where it is desired to retrieve magnetizable articles in a completely automatic operation.

If additional rows of cavities 16 are necessitated to complete a given operation it may be necessary to increase the overall width of the retriever 21. To this end, in Figure 6, two of the retrievers of Figure 5 are disposed immediately adjacent and contiguous to one another and may be suitably connected together and adapted to rotate upon a common driven shaft (not shown). The same reference numerals have been again used to identify identical elements.

In Figure 7 is shown a modified magnetic retriever 45. The retriever 45 includes a spoked wheel 46. Disposed at the outer margin of the wheel 46 and alternated circumferentially with one another are soft steel blocks 47 and permanent magnet blocks 47. If one of the permanent magnet blocks 47 is magnetized with a north pole N to the radially inner side and a south pole S to the radially outer side, the north and south poles will be reversed in the soft steel blocks 46 adjacent thereto, giving alternate polarity. Disposed at the outer margin of the retriever 45 is a sleeve of non-magnetic material 48. In this instance, the blocks 46 and 47 are carried between the wheel 46 and the sleeve 48.

In Figure 8 is shown still another modified magnetic retriever 50. In this instance, the retriever 50 includes a spoked wheel 51 having at its outer margin circumferentially spaced permanent magnet blocks 52. These blocks 52 are carried between a non-magnetic sleeve 53 and the outer margin of the wheel 51.

Figure 9 shows still another modified magnetic retriever 55 and includes a spoked wheel 56. The present construction is similar to the one shown in Figure 7 except that soft steel block portions 57 are formed integrally with the wheel 56 and are alternated circumferentially with magnet blocks 58. The magnet blocks are carried between the outer margin of the wheel 56 and a non-magnetic sleeve 59 which is disposed about the perimeter of the retriever 55.

In Figure 10 is shown another modified magnetic retriever 60 including a spoked hub wheel portion 61 having disposed and suitably connected at its radially outer margin an integral cast magnet 62 with the poles of the magnetic portions 63 arranged in the same manner as in Figures 5-9.

In Figures 11-14 is shown still another modified magnetic retriever 65. The magnetic retriever 65 is adapted in each case to be driven by a non-magnetic shaft 66. Disposed about the shaft is the retriever 65 which includes two soft iron or steel, axially spaced, radially extending L-shaped annular members 67 separated from one another at their respective outer margins by an air gap bridged by an annular non-magnetic filler 68. Disposed between the outer margin of the retriever 65 and the shaft 66 are magnet blocks or elements 69, each having axially spaced poles N, S. A continuous area of attraction across the air gap between the outer margins of the two-piece retriever is obtained. The filler 68 provides a smooth surface at the outer periphery of the magnetic retriever 65.

The magnetic elements 69 that are placed between the soft steel pieces 67 can be of various types, either permanent magnets or electromagnets, and of various shapes, as is exemplified in Figures 12-14. In Figure 12 the magnetic elements 69 comprise arcuate segments 70. In Figure 13, the magnetic element 69 comprises a ring magnet 71. In Figure 14, the magnetic elements 69 may comprise square or round rods 72. In each of the retrievers 65 shown in Figures 11-14, the axially spaced side wall members 67 act as pole pieces for the magnets 69.

In Figure 15 is shown a modified means for unloading a magnetic retriever 75. Disposed about the perimeter of the retriever 75 is a non-magnetic endless belt 76. This belt which may be of non-magnetic metal or other material, extends about a non-magnetic pulley 77 in spaced relationship to the retriever 75.

As the retriever 75 rotates in a clockwise direction above an adjacent counter clockwise rotating work table 78 having cavities 79 carrying magnetizable articles 80, the articles 80 are picked up by the magnetic retriever 75 upon belt 76. As the endless non-magnetizable belt 76 passes from the magnetic retriever 75 around the pulley 77 the articles 80 are dropped into a bin or hopper 81.

It will be understood that modifications and variations may be effected without departing from the scope of the novel concepts of the present invention.

I claim as my invention:

1. In combination with an abrading wheel structure including converging means for bringing articles into an abrading zone for abrading contact by the wheel and sockets associated with said converging means for holding the articles as the same are abraded, magnet means for displacing and removing said articles from said sockets after they have been abraded at said zone, said magnet means comprising a rotary magnetized wheel for progressive rotation over and in close proximity to said articles in said sockets beyond said abrading zone for picking said articles out of the sockets, and a conveyor trained around said magnetized wheel to which the magnetically attracted articles adhere, said conveyor extending around and beyond said wheel for dropping the articles after the same leave the area of the magnetic influence of the magnetized wheel.

2. In combination with an abrading wheel structure including converging means for bringing articles into an abrading zone for abrading contact by the wheel and sockets associated with said converging means for holding the articles as the same are abraded, magnet means for displacing and removing said articles from said sockets after they have been abraded at said zone, said magnet means comprising a rotary magnetized wheel for progressive rotation over and in close proximity to said articles in said sockets beyond said abrading zone for picking said articles out of the sockets, and a conveyor trained around said magnetized wheel to which the magnetically attracted articles adhere, said conveyor extending around and beyond said wheel for dropping the articles after the same leave the area of the magnetic influence of the magnetized wheel, and means for returning the articles to other sockets associated with said converging means for further abrading at said abrading zone and for removal magnetically by said magnetized wheel in a repetition of the operation.

3. A method of abrading magnetizable articles by subjecting the articles to a number of passes through an abrading zone in an abrading apparatus, the steps of progressively conveying the magnetizable articles onto a rotating table, firmly holding the magnetizable articles in the passing of the magnetizable article through an abrading zone, magnetically retrieving the magnetizable articles downstream of the abrading zone from the rotating table and conveying and loading the magnetizable articles back onto the work table for further abrading in the same abrading zone.

4. A method of processing magnetizable articles by subjecting the articles to a number of passes through a processing zone in a processing apparatus, the steps of progressively conveying the magnetizable articles onto a rotating table, firmly holding the magnetizable articles in the passing of the magnetizable articles through the processing zone, magnetically retrieving the magnetizable articles downstream of the processing zone from the rotating table and conveying the magnetizable articles back onto the work table for further processing in the same processing zone.

5. In a processing apparatus for processing magnetizable articles including converging means for bringing the article into a processing zone, means associated with said converging means for holding the articles as they are processed, magnet means for displacing and removing the articles from the holding means after they have been processed at said zone, said magnet means comprising a rotary magnetized wheel for progressive rotation over and in close proximity to said magnetizable articles for retrieving them from their holding means, and a conveyor belt trained around said magnetized wheel to which the magnetically attracted articles adhere, said belt extending around and beyond said magnetized wheel for dropping the articles after they leave the area of the magnetic influence of the magnetized wheel.

6. In a processing apparatus for processing magnetizable articles including a power driven rotary work table for bringing the articles into a processing zone, a magnetized wheel having at least one magnet disposed adjacent the periphery thereof for magnetically removing the articles from said work table after they have been processed at said zone, and means to remove the articles from said magnetized wheel and to return them on said work table for further processing, said processing zone being adapted to simultaneously process unfinished as well as partially finished articles.

7. In a processing apparatus for processing magnetizable articles including a power driven rotary work table for bringing the articles into a processing zone, a magnetized wheel having at least one magnet disposed adjacent the periphery thereof for magnetically removing the articles from said work table after they have been processed at said zone, and means to remove the articles from said magnetized wheel and to return them on said work table for further processing, said processing zone being adapted to simultaneously process unfinished as well as partially finished articles, said magnetized wheel and work table being disposed at right angles relative to one another and rotating at the same rate.

8. A magnetic retriever for unloading magnetizable articles from an apparatus after having been worked upon, comprising a spoked wheel including a hub portion for connection with power means, said wheel carrying at its outer margin an annular ring portion, said ring portion carrying at least one magnetized element, and a non-magnetic sleeve about the outer periphery of said ring portion and retriever to present a smooth surface to which magnetizable articles may adhere when brought into the magnetic field of said at least one magnetized element.

9. A magnetic retriever for unloading magnetizable articles from an apparatus after having been processed comprising a wheel for connection with means to actuate same, said wheel having L-shaped in cross-section annular elements opposed to one another, a non-magnetic structure between the L-shaped elements at the radially outer side of the wheel, the opposed elements defining a housing, and at least one magnetic element in the housing to set up a magnetic field at the outer margin of said wheel.

10. An abrading machine for abrading opposite faces of magnetizable articles, an abrading zone including an abrader, means for conveying the articles into the abrading zone and for holding the articles with one of the opposed faces on the magnetizable articles exposed as the articles are moved into the abrading zone and abraded by the abrader, means for automatically loading the articles onto the means for conveying and holding, magnetic retriever means comprising a single magnetizable wheel angularly disposed relative to said means for conveying the articles which wheel is adapted for unloading the magnetizable articles from the means for conveying and for holding after the articles have been abraded, and means comprising a scoop and a chute with the scoop being adapted to scrape the articles from the wheel for unloading the partially abraded magnetizable articles from the magnetic retriever means and with the chute being for reloading the partially abraded magnetizable articles onto the means for conveying and holding with the opposite faces of the articles being exposed for abrading as the articles are passed through the abrading zone.

11. A processing apparatus for automatically processing magnetizable articles, a processing zone, means for conveying the articles into the processing zone and for holding the articles with one of the opposed faces on the magnetizable articles exposed as the articles are moved into the processing zone and processed, means for automatically loading the articles onto the means for conveying and holding, magnetic retriever means comprising a single magnetizable wheel angularly disposed relative to said means for conveying the articles which wheel is adapted for unloading the processed magnetizable articles from the means for conveying and for holding after the articles have been processed, and means comprising a scoop and a chute with the scoop being adapted to scrape the articles from the wheel for unloading the partially processed articles from the magnetic retriever means and with the chute being for reloading the articles upon the means for conveying and for holding so the articles may be further processed in the processing zone.

12. A processing apparatus for automatically processing magnetizable articles, a processing zone, means for conveying the articles into the processing zone and for holding the articles with one of the opposed faces on the magnetizable articles exposed as the articles are moved into the processing zone and processed, means for automatically loading the articles onto the means for conveying and holding, magnetic retriever means comprising a single magnetizable wheel angularly disposed relative to said means for conveying the articles which wheel is adapted for unloading the processed magnetizable articles from the means for conveying and for holding after the articles have been processed, means for unloading the partially processed articles from the magnetic retriever means and for reloading the articles upon the means for conveying and for holding so the articles may be further processed in the processing zone, said wheel being adapted to unload the further processed articles from the means for conveying and for holding, and means for unloading the further processed articles from the magnetic retriever means.

13. A processing apparatus for automatically processing magnetizable articles, a processing zone, means for conveying the articles into the processing zone and for holding the articles in position as the articles are moved into the processing zone and processed, means for automatically loading the articles onto the means for conveying and holding, magnetic retriever means comprising a single magnetizable wheel angularly disposed relative to said means for conveying the articles which wheel is adapted for unloading the processed magnetizable articles from the means for conveying and for holding after the articles have been processed, and means for unloading the processed articles from the magnetic retriever means and for reloading the articles upon the means for conveying and holding so the articles may be further processed.

14. In a method of processing magnetizable articles by subjecting the articles to a number of passes through a processing zone in a processing apparatus, the steps of conveying the magnetizable articles through the processing zone, processing one side of the article, magnetically retrieving the magnetizable article downstream of the processing zone, turning the articles upside-down and conveying the articles again through the same processing zone to process the other side of the article, and unloading the magnetizable articles downstream of the processing zone.

15. In a method of processing magnetizable articles, the steps of moving unfinished magnetizable articles through a processing zone partially processing the articles, magnetically retrieving the partially finished magnetizable articles downstream of the processing zone, simultaneously moving additional unfinished magnetizable articles and the partially finished magnetizable articles through the same processing zone in a repetitive operation until the magnetizable articles have been processed to specification.

16. An abrading apparatus for automatically abrading opposite faces of blanks in a continuous type operation, a rotary structure having radially spaced rows of annularly spaced blank holders, unfinished blank loading means associated with the rotary structure for loading unfinished blanks in at least one of the radially spaced rows of holders during the rotation of the rotary structure, an abrader associated with the rotary structure downstream of the unfinished blank loading means for abrading one of the faces of the blanks, and unloading and loading means associated with the rotary structure downstream of the processing zone for removing the partially abraded blanks from said at least one of the radially spaced rows of holders and for loading the partially abraded blanks in at least one other of the radially spaced rows of holders so that the partially abraded blanks are turned up side down so the other of the faces of the blanks are exposed for abrading, the rotary structure being adapted to carry the partially abraded blanks as well as the unfinised blanks through the abrader so that the abrading apparatus may simultaneously abrade unfinished blanks as well as partially abraded blanks.

17. An abrading apparatus for automatically abrading blanks, a rotary structure having radially spaced rows of annularly spaced blank holders, unfinished blank loading means associated with the rotary structure for loading unfinished blanks in at least one of the radially spaced rows of holders during the rotation of the rotary structure, an abrading zone associated with the rotary structure downstream of the unfinished blank loading means for partially abrading the blanks, and unloading and loading means associated with the rotary structure downstream of the processing zone for removing the partially abraded blanks from said at least one of the radially spaced rows of holders and for loading the partially abraded blanks in at least one other of the radially spaced rows of holders, the unfinished blank loading means operating to refill the holders as they are emptied by said unloading and loading means, the rotary structure being adapted to carry the partially abraded blanks as well as the unfinished blanks through the abrading zone so that the apparatus may process unfinished blanks as well as partially abraded blanks.

18. The abrader of claim 17 further characterized by said unloading and loading means for removing the partially finished blanks from the rotary structure and said holders in said at least one other of the radially spaced rows of holders being cooperable together to load the partially abraded blanks so that other surfaces of the partially abraded blanks may be exposed for abrading by the abrading zone.

19. A processing apparatus for automatically processing blanks, a rotary structure having radially spaced rows of annularly spaced blank holders, unfinished blank loading means associated with the rotary structure for loading unfinished blanks in at least one of the radially spaced rows of holders during the rotation of the rotary structure, a processing zone associated with the rotary structure downstream of the unfinished blank loading means for partially finishing the blanks, unloading and loading means associated with the rotary structure downstream of the processing zone for removing the partially finished blanks from said at least one of the radially spaced rows of holders and for loading the partially finished blanks in at least one other of the radially spaced rows of holders, the unfinished blank loading means operating to refill the holders as they are emptied by said unloading and loading means, the rotary structure being adapted to carry the partially finished blanks as well as the unfinished blanks through the processing zone so that the apparatus may process unfinished blanks as well as partially finished blanks, and further finished blank unloading means associated with the rotary structure for unloading the partially finished blanks after they have been further finished after having travelled through the processing zone.

20. The apparatus of claim 19 further characterized by said unloading and loading means and said further finished blank unloading means both utilizing a common magnetic retriever in their operation.

21. The apparatus of claim 20 further characterized by said unloading and loading means having a scoop and chute means for removing the partially finished blanks from the retriever and for loading the partially finished blanks in said at least one other of the radially spaced rows of holders.

22. The apparatus of claim 19 further characterized by the unloading and loading means comprising a wheel having alternating circumferentially spaced magnetic and magnetizable elements disposed generally at the margin of the wheel to provide a continuous magnetic field at the periphery of said retriever.

23. The apparatus of claim 19 further characterized by said unloading and loading means for removing the partially finished blanks from the rotary structure and said holders in said at least one other of the radially spaced rows of holders being cooperable together to load the partially finished blanks in said holders in said at least one other of the radially spaced rows of holders so that other surfaces of the partially finished blanks may be exposed for processing by the processing zone.

24. The apparatus of claim 19 further characterized by said rotary structure including a series of segments each bearing some of said blank holders and with said segments being positioned so that the holders are disposed in radially spaced annular rows.

25. In a method of processing articles by moving each of the articles in a stream through a first arc while a portion of each of the articles is processed, angularly moving the stream of articles away from the plane of the first arc after they have been initially processed, directing the stream of partially finished articles in a second arc concentric with the first arc and in a plane generally common to the first arc while a different portion of each of the articles is processed whereby each of the articles travels through a series of different sized concentric arcs as the articles are processed to the desired extent.

References Cited in the file of this patent

UNITED STATES PATENTS

| | | |
|---|---|---|
| 1,198,772 | Roach | Sept. 19, 1916 |
| 1,436,309 | Frost | Nov. 21, 1922 |
| 1,923,931 | Jones | Aug. 22, 1933 |
| 1,983,471 | Kramer | Dec. 4, 1934 |
| 2,766,556 | Messerschmidt | Oct. 16, 1956 |